US012593873B2

(12) United States Patent
Wu et al.

(10) Patent No.: US 12,593,873 B2
(45) Date of Patent: Apr. 7, 2026

(54) VAPOR GENERATION DEVICE

(71) Applicant: SHENZHEN FIRST UNION TECHNOLOGY CO., LTD., Shenzhen City (CN)

(72) Inventors: Zexin Wu, Shenzhen City (CN); Zaiming Shi, Shenzhen City (CN); Zhongli Xu, Shenzhen City (CN); Yonghai Li, Shenzhen City (CN)

(73) Assignee: SHENZHEN FIRST UNION TECHNOLOGY CO., LTD., Shenzhen City (CN)

(*) Notice: Subject to any disclaimer, the term of this patent is extended or adjusted under 35 U.S.C. 154(b) by 388 days.

(21) Appl. No.: 18/269,564

(22) PCT Filed: Dec. 24, 2021

(86) PCT No.: PCT/CN2021/141228
§ 371 (c)(1),
(2) Date: Jun. 25, 2023

(87) PCT Pub. No.: WO2022/135570
PCT Pub. Date: Jun. 30, 2022

(65) Prior Publication Data

US 2024/0057673 A1 Feb. 22, 2024

(30) Foreign Application Priority Data

Dec. 25, 2020 (CN) ......................... 202011556906.3

(51) Int. Cl.
*A24F 40/465* (2020.01)
*H05B 6/10* (2006.01)

(52) U.S. Cl.
CPC ........... *A24F 40/465* (2020.01); *H05B 6/108* (2013.01); *H05B 2206/024* (2013.01)

(58) Field of Classification Search
CPC ........ A24F 40/485; A24F 40/60; A24F 40/00; A24F 40/10; A24F 40/53
See application file for complete search history.

(56) References Cited

U.S. PATENT DOCUMENTS

2014/0305449 A1* 10/2014 Plojoux .................. A24F 40/46 131/328
2014/0305559 A1* 10/2014 Takemoto .............. B60C 11/12 152/209.8

(Continued)

FOREIGN PATENT DOCUMENTS

CN 105934169 A 9/2016
CN 207236078 U 4/2018

(Continued)

*Primary Examiner* — Alex B Efta
(74) *Attorney, Agent, or Firm* — Scully, Scott, Murphy & Presser, P.C.

(57) ABSTRACT

A vapor generation device is configured to heat a vapor generation article to generate an aerosol for inhalation, including: a cavity, configured to receive a vapor generation article; a susceptor, configured to be penetrated by a changing magnetic field and generate heat, to heat the vapor generation article received in the cavity; an extractor, at least partially received in the cavity and configured to extract the vapor generation article vapor generation article through movement in an axial direction of the cavity or removal from the cavity; an induction coil, configured to generate the changing magnetic field and held on the extractor; and a first electrical contact, configured to conduct with the induction coil when the extractor is received in the cavity, to supply power to the induction coil.

16 Claims, 5 Drawing Sheets

(56) References Cited

U.S. PATENT DOCUMENTS

| | | | | |
|---|---|---|---|---|
| 2014/0338686 | A1* | 11/2014 | Plojoux | A24F 40/485 131/329 |
| 2020/0214351 | A1 | 7/2020 | Lee | |
| 2020/0268053 | A1 | 8/2020 | Thorsen et al. | |
| 2020/0352230 | A1 | 11/2020 | An et al. | |
| 2021/0093009 | A1* | 4/2021 | Park | A24F 40/465 |
| 2021/0298360 | A1* | 9/2021 | Acconcia | A24F 40/20 |

FOREIGN PATENT DOCUMENTS

| | | | |
|---|---|---|---|
| CN | 109123807 | A | 1/2019 |
| CN | 208480605 | U | 2/2019 |
| CN | 209376679 | U | 9/2019 |
| CN | 110876495 | A | 3/2020 |
| CN | 110913712 | A | 3/2020 |
| CN | 211832820 | U | 11/2020 |
| CN | 212117073 | U | 12/2020 |
| RU | 2711875 | C2 | 1/2020 |
| WO | 2019/170901 | A1 | 9/2019 |
| WO | 2020/063868 | A1 | 4/2020 |

* cited by examiner

VAPOR GENERATION DEVICE

CROSS-REFERENCE TO RELATED APPLICATIONS

This application is a 35 U.S.C. § 371 National Phase conversion of International (PCT) Patent Application No. PCT/CN2021/141228, filed on Dec. 24, 2021, which claims priority to Chinese Patent Application No. 202011556906.3, filed with the China National Intellectual Property Administration on Dec. 25, 2020 and entitled "VAPOR GENERATION DEVICE", which is incorporated herein by reference in its entirety. The PCT International Patent Application was filed and published in Chinese.

TECHNICAL FIELD

Embodiments of this application relate to the technical field of heat not burning cigarette devices, and in particular, to a vapor generation device.

BACKGROUND

Tobacco products (such as cigarettes and cigars) burn tobacco during use to produce tobacco smoke. Attempts are made to replace these tobacco-burning products by manufacturing products that release compounds without burning tobacco.

An example of this type of products is a heating apparatus that releases compounds by heating rather than burning materials. For example, the materials may be tobacco or other non-tobacco products, where the non-tobacco products may or may not include nicotine. An existing heating device of an electromagnetic induction type is generally used to heat tobacco or other non-tobacco products.

SUMMARY

Embodiments of this application provide a vapor generation device, configured to heat a vapor generation article to generate an aerosol for inhalation, including:

- a cavity, configured to receive a vapor generation article;
- a susceptor, configured to be penetrated by a changing magnetic field and generate heat, to heat the vapor generation article received in the cavity;
- an extractor, at least partially received in the cavity and configured to extract the vapor generation article through movement in an axial direction of the cavity or removal from the cavity;
- an induction coil, configured to generate the changing magnetic field and held on the extractor; and
- a first electrical contact, arranged in the cavity, where the first electrical contact is configured to conduct with the induction coil when the extractor is received in the cavity, so as to supply power to the induction coil.

Because the induction coil is formed on the extractor, the induction coil has a smaller spiral inner diameter than that wound on an outer wall forming a cavity component, so that the generated magnetic field may be more concentrated.

In a preferred implementation, the first electrical contact is located in the cavity.

In a preferred implementation, a second electrical contact electrically connected to the induction coil is formed on the extractor; and

- the first electrical contact is configured to conduct with the induction coil by conducting with the second electrical contact when the extractor is received in the cavity.

In a preferred implementation, the vapor generation device further includes:

- a conductive element, electrically connected to the induction coil, and forming the second electrical contact by at least a part of the conductive element.

In a preferred implementation, the conductive element includes a first part extending in an axial direction of the induction coil and a second part extending in a radial direction of the induction coil, where

- the induction coil is electrically connected to the first part; and
- the second part forms the second electrical contact.

In a preferred implementation, the conductive element is positioned between the extractor and the induction coil.

In a preferred implementation, the extractor is provided with a holding groove, and the conductive element is at least partially accommodated and held in the holding groove.

In a preferred implementation, a connection point protruding relative to the conductive element is arranged on the conductive element, and the induction coil is electrically connected to the conductive element through the connection point.

In a preferred implementation, the conductive element is in a sheet shape.

In a preferred implementation, the induction coil has an inner diameter in a range of 6.0 mm to 7.5 mm.

In a preferred implementation, a protrusion is arranged on the extractor, where the protrusion is configured to maintain, when the extractor is received in the cavity, a channel that allows air to enter the extractor and that is between the extractor and the inner wall of the cavity.

In a preferred implementation, the vapor generation device further includes:

- a magnetic field shielding member, configured to surround or wrap the induction coil in a circumferential direction of the induction coil.

In a preferred implementation, the vapor generation device further includes:

- a housing having a near end and a far end opposite to each other in a longitudinal direction, where the housing includes:
- a lower housing, close to the far end, and having an inner wall and an outer wall opposite to each other in a radial direction where the inner wall defines the cavity extending in the longitudinal direction;
- an upper housing, close to the near end, and at least partially surrounding the outer wall of the lower housing; and
- an airflow channel, including a first part extending between the upper housing and the outer wall of the lower housing along the far end toward the near end, and a second part extending between the inner wall of the lower housing and the extractor along the near end toward the far end.

Another embodiment of this application further provides a vapor generation device, configured to heat a vapor generation article to generate an aerosol for inhalation, and including: a near end and a far end opposite to each other in a longitudinal direction;

- a lower housing, close to the far end, and having an inner wall and an outer wall opposite to each other in a radial direction, where the inner wall defines a cavity extending in a longitudinal direction, and the cavity is configured to receive a vapor generation article;
- a heater, configured to at least partially extend in the cavity to heat the vapor generation article received in the cavity;

an upper housing, close to the near end, and at least partially surrounding the outer wall of the lower housing;

a cylindrical extractor, at least partially received in the cavity and configured to extract the vapor generation article received in the cavity; and an airflow channel, including a first part extending between the upper housing and the outer wall of the lower housing along the far end toward the near end, and a second part extending between the inner wall of the lower housing and the cylindrical extractor along the near end toward the far end.

In a preferred implementation, a gap at a combined part of the upper housing and the lower housing forms an inlet of the airflow channel.

In a preferred implementation, the airflow channel further includes a third part extending in the extractor along the far end toward the near end.

BRIEF DESCRIPTION OF THE DRAWINGS

One or more embodiments are exemplarily described with reference to the corresponding figures in the accompanying drawings, and the exemplary descriptions are not to be construed as limiting the embodiments. Elements/modules and steps in the accompanying drawings that have same reference numerals are represented as similar elements/modules and steps, and unless otherwise particularly stated, the figures in the accompanying drawings are not drawn to scale.

DETAILED DESCRIPTION

For ease of understanding of this application, this application is described below in more detail with reference to accompanying drawings and specific implementations.

Figure 1:
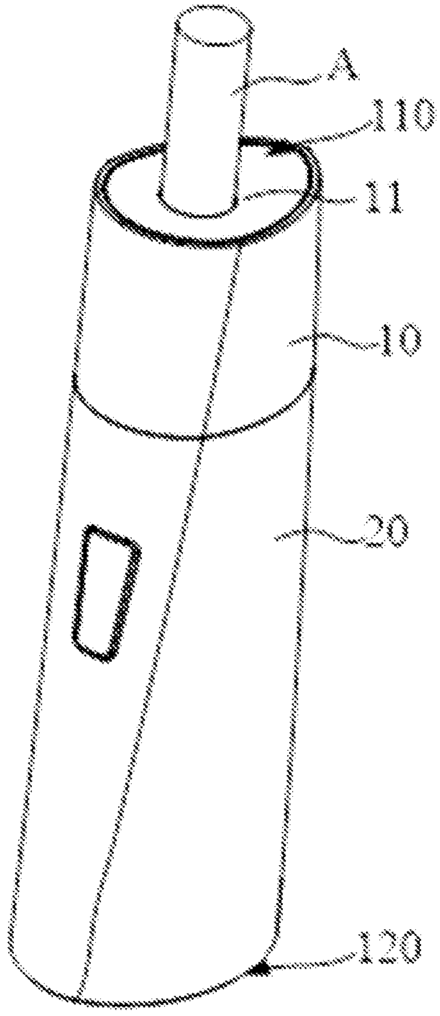
FIG. 1 is a schematic diagram of an operating state of a vapor generation device according to an embodiment of this application.
Figure 2:
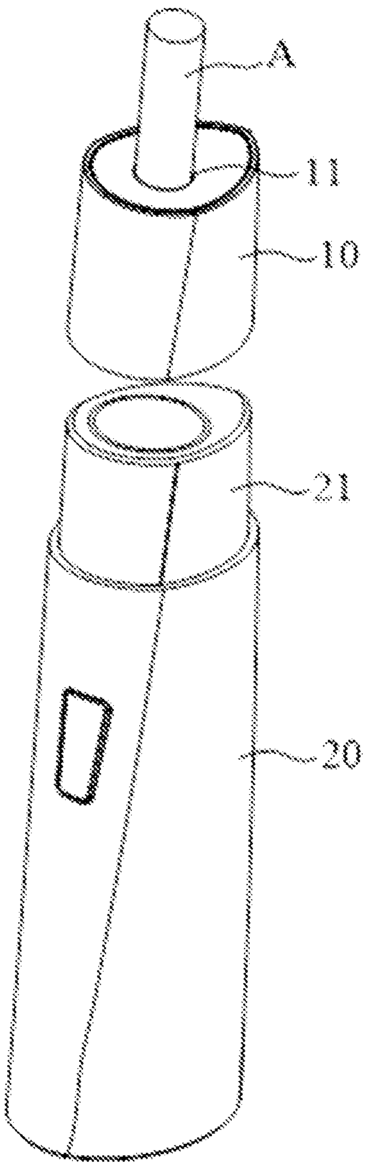
FIG. 2 is a schematic diagram of the vapor generation device in FIG. 1 in an extraction state.
Figure 3:
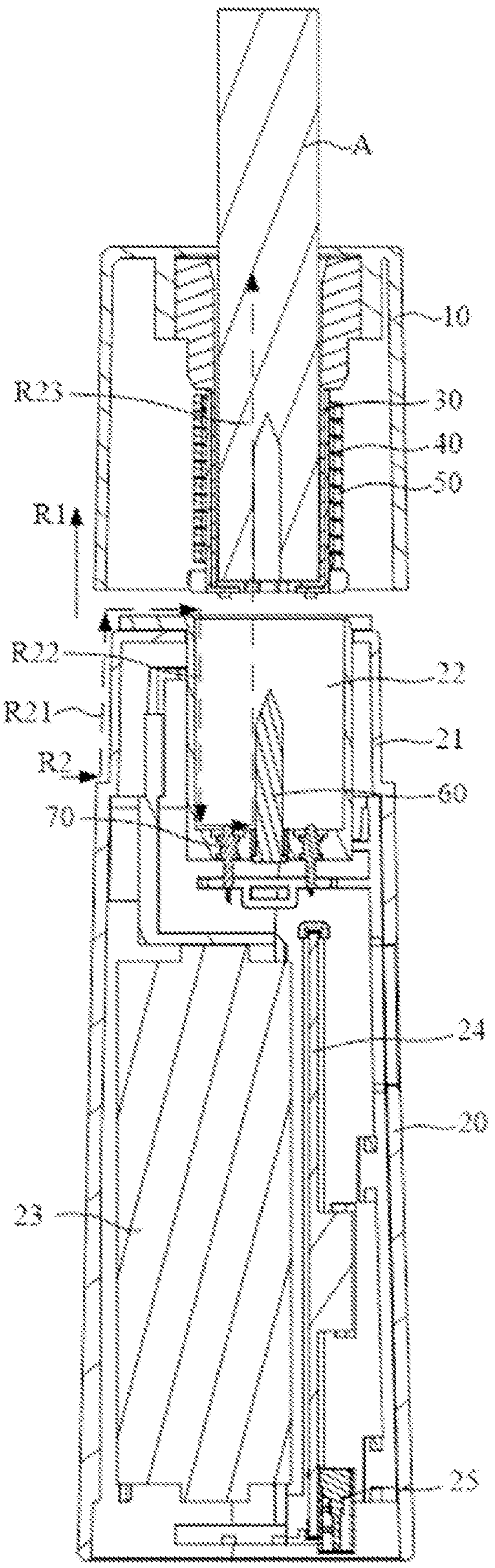
FIG. 3 is a schematic cross-sectional view of the vapor generation device in FIG. 2 in the extraction state.

For a configuration of a vapor generation device provided in an embodiment of this application, reference may be made to FIG. 1 to FIG. 3. The vapor generation device is configured to receive and heat an aerosol generation article A, such as a cigarette, to make at least one volatile component thereof volatilized to form an aerosol for inhalation. Base on functional requirements, structural and functional components include:

a housing, an overall shape of which being substantially a long cylinder in a hollow, where the housing is formed by the cooperation of an upper housing 10 and a lower housing 20 that are sequentially arranged in a length direction. The housing has a near end 110 and a far end 120 opposite to each other in the length direction. During use, the near end 110 is used as an end portion close to a user for inhaling the aerosol generation article A and performing an operation.

Further, the upper housing 10 is provided with a receiving hole 11 on a surface of the near end 110. During use, the aerosol generation article A may be received in the housing through the receiving hole 11 for heating or removal.

Further, as shown in FIG. 2, the upper housing 10 and the lower housing 20 are removably combined during use. The lower housing 20 has a part 21 that is close to the near end 110 and has a reduced outer diameter, and is configured to provide guidance in an operation of combining the upper housing 10 with the lower housing 20 or removing the upper housing 10 from the lower housing 20.

Further, as shown in FIG. 3, extraction of the aerosol generation article A is implemented through the operation of removing the upper housing 10 from the lower housing 20, so that the aerosol generation article A is detached from a heating device. Specifically, a cylindrical extractor 30 for accommodating and holding the aerosol generation article A is arranged on the upper housing 10. During use, the aerosol generation article A is accommodated and held in the cylindrical extractor 30. When the upper housing 10 is removed from the lower housing 20 along an arrow R1 in FIG. 3, the cylindrical extractor 30 may carry the held aerosol generation article A to be removed from the lower housing 20, to facilitate the extraction of the aerosol generation article A by the user.

According to FIG. 3, the vapor generation device heats the aerosol generation article A through electromagnetic induction heating. Specifically, a cavity 22 is provided in the lower housing 20, and is configured to define a heating space for receiving and heating the aerosol generation article A; and a susceptor 60 is in a shape of a pin or a sheet extending along the cavity 22. When the aerosol generation article A, held by the cylindrical extractor 30, is received in the cavity 22, the susceptor 60 may be inserted into the aerosol generation article A for heating. Specifically, the susceptor 60 is prepared by using a sensing material such as permalloy and stainless iron, and is configured to be coupled to a changing magnetic field, so that the susceptor 60 can be penetrated by the changing magnetic field to generate heat to heat an inhalable material A.

An induction coil 50, arranged around at least a part of the cylindrical extractor 30, and is configured to generate, when providing an alternating current to the cylindrical extractor 30, a changing magnetic field penetrating the susceptor 60.

In a preferred implementation shown in FIG. 3, the induction coil 50 is fixed and held outside the cylindrical extractor 30. Then, when the upper housing 10 is removed, the induction coil 50 can be removed from the cavity 22 of the lower housing 20 together with the upper housing 10.

Based on a complete implementation, the lower housing 20 includes:

a core 23, configured to supply power;

a circuit 24, configured to guide a current between the core 23 and the induction coil 50, to output an alternating current to the induction coil 50, so that the induction coil 50 generates an alternating magnetic field, and a charging interface 25, configured to charge the core 23.

Figure 4:
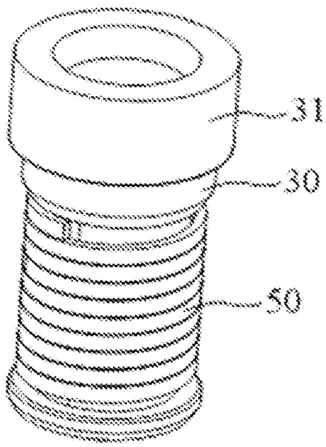
FIG. 4 is a schematic structural diagram of an extractor assembly in FIG. 3 from a perspective.
Figure 5:
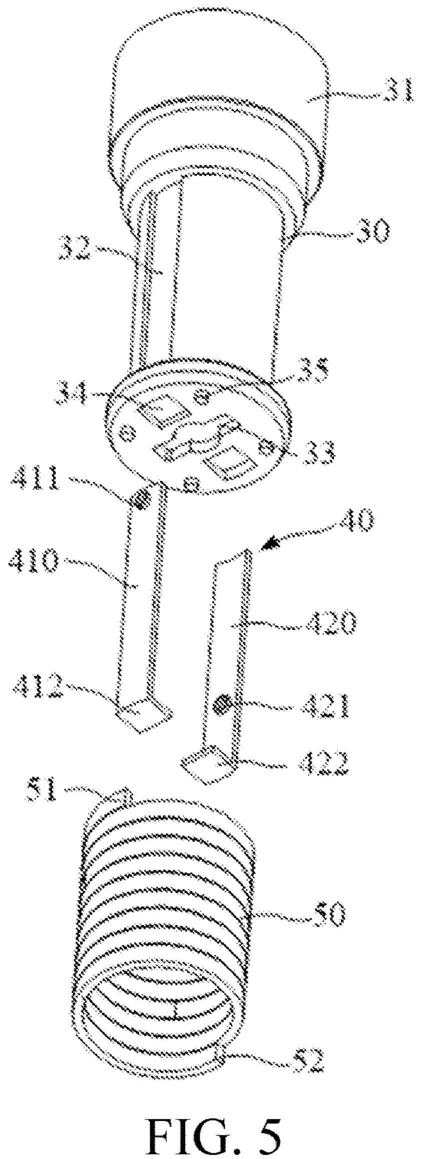
FIG. 5 is a schematic exploded view of parts of the extractor assembly in FIG. 4 before assembly.
Figure 6:
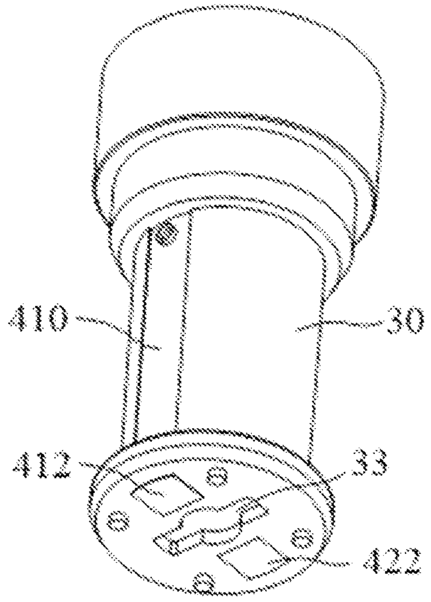
FIG. 6 is a schematic diagram of a conductive sheet and a cylindrical extractor in FIG. 5 after assembly.

In order to supply power to the induction coil 50 held on the cylindrical extractor 30, in an optional implementation, a configuration of the cylindrical extractor 30 may be shown in FIG. 4 to FIG. 6, including:

a part 31 that is close to the near end 110 and has a larger outer diameter. An outer diameter of the larger outer diameter part 31 is larger than an outer diameter of another part. The part 31 having a larger outer diameter is connected to the upper housing 10 as a whole by riveting, hot pressing, injection molding, or the like, so that the cylindrical extractor 30 is actuated by the upper housing 10 together with the part 31 under a removal operation by the user.

In another optional implementation, the upper housing 10 causes the cylindrical extractor 30 to extract the aerosol generation article A by moving a certain distance relative to the lower housing 20 without being completely detached from the lower housing 20. By causing the cylindrical extractor 30 to move a certain distance, the aerosol generation article A is substantially loosened or detached from the susceptor 60, which is convenient for the user to perform the removal operation.

An upper end of the cylindrical extractor 30 is in communication with the receiving hole 11, and a lower end portion is configured as a closed end for abutting against an inner wall of the closed end to form a stop when the aerosol generation article A is received inside. The lower end portion of the cylindrical extractor 30 is provided with a hole 33 for the susceptor 60 to penetrate and inserted into the aerosol generation article A inside. In an optional implementation, the hole 33 may include a narrow slit fitted to a sheet-like susceptor 60, a circular aperture fitted to a pin-like susceptor 60, or a combination thereof as shown in FIG. 6 which can fit both sheet-like and pin-like susceptors 60.

A first holding groove 32 extends on an outer surface in a length direction of the cylindrical extractor 30. The first holding groove 32 is configured to mount and hold the sheet-shaped conductive element 40. Certainly, there are two first holding grooves 32, which are arranged symmetrically on the outer surface of the cylindrical extractor 30 in a radial direction of the cylindrical extractor 30, where one is configured to accommodate and hold a positive electrode conductive sheet 410, and the other is configured to accommodate and hold a negative electrode conductive sheet 420. The positive electrode conductive sheet 410 and the negative electrode conductive sheet 420 are both in a shape of a thin sheet, have a thickness of approximately not greater than 1 mm, and are made of gold, silver, copper, or alloy thereof with high electrical conductive performance.

Further, for details, reference may be made to FIG. 5 and FIG. 6. A second mounting groove 34 is further provided on a surface of the lower end portion of the cylindrical extractor 30. The positive electrode conductive sheet 410 and the negative electrode conductive sheet 420 are both in a sheet shape, main parts of which extend vertically, and have a positive electrode contact part 412 and a negative electrode contact part 422 extending horizontally at a lower end. After assembly, the positive electrode conductive sheet 410 and the negative electrode conductive sheet 420 are mainly held in the first holding groove 32, and the positive electrode contact part 412 and the negative electrode contact part 422 are held in the second mounting groove 34 in an exposed state, so as to be used as conductive contacts.

Further, when a first end 51 of the induction coil 50 is connected to the positive electrode conductive sheet 410, and a second end is connected to the negative electrode conductive sheet 420, so that power may be supplied to the induction coil 50 through the positive electrode contact part 412 and the negative electrode contact part 422. Details are shown in FIG. 3 with reference to specific implementations.

Two conductive elastic pins 70 extending in the length direction are arranged in the lower housing 20, and the conductive elastic pins 70 are connected to the circuit 24. The conductive elastic pin 70 is at least partially exposed in the cavity 22 to form an electrical contact, so that when the cylindrical extractor 30 is received in the cavity 22, top ends of the two conductive elastic pins 70 can elastically abut against the positive electrode contact part 412 and the negative electrode contact part 422 respectively to form conductivity, thereby forming a complete path of the induction coil 50.

Further, in a preferred implementation, connection structures or components such as magnets and buckles are arranged on the upper housing 10 and the lower housing 20, so that when the cylindrical extractor 30 is received in the cavity 22, the conductive elastic pin 70 may be stably held in a compressed state through magnetic attraction or buckles. On the one hand, the cylindrical extractor 30 is prevented from ejecting due to elasticity of the conductive elastic pins 70. On the other hand, the top ends of the conductive elastic pins 70 are prevented from being in poor contact with the positive electrode contact part 412 and the negative electrode contact part 422.

In an optional implementation, because an outer surface of the induction coil 50 is usually coated with an insulating layer or sprayed with insulating paint, the induction coil 50 may stably connect the first end 51 and the second end 52 to a sheet-shaped conductive element 40 in a welding manner. In a preferred implementation shown in FIG. 5, a relatively protruding positive electrode welding point 411 is arranged on an outer surface of the positive electrode conductive sheet 410 close to the first end 51, and a relatively protruding negative electrode welding point 421 is arranged on an outer surface of the negative electrode conductive sheet 420 close to the second end 52.

Alternatively, in other optional implementations, the protruding positive electrode welding point 411 or negative electrode welding point 421 may be replaced by threaded holes, the first end 51 and the second end 52 are respectively drilled corresponding to the induction coil 50, and then the first end 51 and the second end 52 are fixed to the threaded holes through screws, to form conductivity.

According to a preferred implementation shown in FIG. 5, the induction coil 50 is a flat coil in a square cross-sectional shape. In other implementations, a commonly used coil in a circular cross-sectional shape may also be used.

With reference to an airflow path during inhalation shown in FIG. 3, a plurality of protruding protrusions 35 are arranged on a lower end surface of the cylindrical extractor 30 shown in FIG. 5. When the cylindrical extractor 30 is received in the cavity 22, the plurality of protruding protrusions 35 are configured to abut against a bottom inner wall of the cavity 22, so that the lower end surface of the cylindrical extractor 30 and the bottom end inner wall of the cavity 22 are kept by a distance and cannot be fully attached to each other, thereby ensuring that the airflow can enter the hole 33 along a gap between the lower end surface of the cylindrical extractor 30 and the bottom end inner wall of the cavity 22 as shown in FIG. 3.

Further, in the foregoing optional implementations, because the induction coil 50 is wound on the outer wall of the cylindrical extractor 30, the induction coil has a smaller spiral inner diameter than that wound on an outer wall forming a cavity component, so that the generated magnetic field may be more concentrated. In a preferred implementation, based on a size of the cylindrical extractor 30 that is made of a polymer plastic material with a thickness in a range of 0.5 to 1.5 mm and is adapted to a commonly used inhalable material A with a diameter of 5.6 mm, the induction coil 50 may have an inner diameter in a range of about 6.0 to 7.5 mm, more preferably in a range of 6.5 to 6.8 mm. A length of a cylindrical induction coil 50 wound in a spiral shape may range from about 8 mm to about 14 mm, and a number of turns of the induction coil 50 may range from about 8 turns to 15 turns. Correspondingly, an internal volume may range from about 0.15 $cm^3$ to about 1.10 $cm^3$.

In a more preferred implementation, a frequency of an alternating current supplied to the induction coil 50 by the circuit 20 ranges from 80 KHz and 400 KHz, and more specifically, the frequency may range from about 200 KHz to 300 KHz.

In a preferred embodiment, a direct-current power supply voltage provided by the core 23 ranges from about 2.5 V to about 9.0 V, and an amperage of a direct current that can be provided by the core 23 *c* ranges from about 2.5 A to about 20 A.

In a preferred embodiment, the susceptor 60 may have a length of about 12 mm, a width of about 4 mm, and a thickness of about 0.5 mm, and may be made of stainless steel of level 430 (SS430). In an alternative embodiment, the susceptor 60 may have a length of about 12 mm, a width of about 5 mm, and a thickness of about 0.5 mm, and may be made of stainless steel of level 420 (SS420). In other variation implementations, the susceptor 60 may further be configured in a cylindrical or tubular shape. During use, a cavity for receiving the aerosol generation article A is formed in an inner space of the susceptor 60, and an aerosol for inhalation is generated by heating an outer periphery of the aerosol generation article A. These susceptors may further be made of an alloy material containing iron and nickel (such as permalloy).

In another optional implementation, the susceptor 60 is made of the sensing material, or is obtained by electroplating or deposition on an outer surface of a heat-resistant substrate material, such as ceramics, to form a coating of the sensing material.

Figure 7:
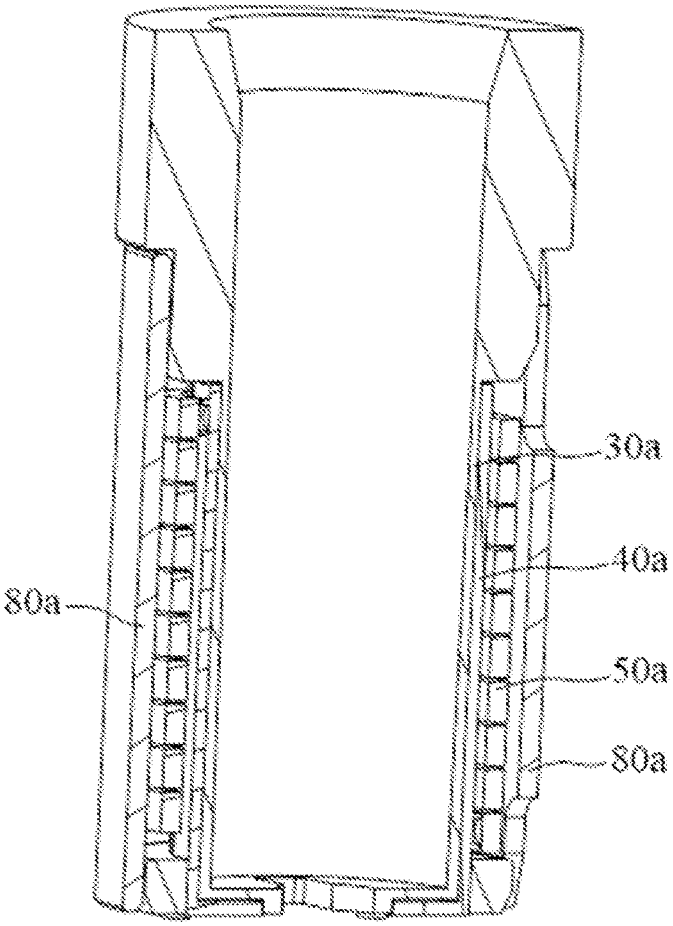
FIG. 7 is a schematic cross-sectional view of an extractor assembly according to another embodiment.

Further, FIG. 7 is a schematic diagram of an extraction assembly combined with the upper housing 10 according to another embodiment, including:

a cylindrical extractor 30*a*, a sheet-shaped conductive element 40, and an induction coil 50*a* that are sequentially arranged in a radial direction from inside to outside, and a protective cover 80*a*, made of a rigid PC material in the implementation, where the cylindrical extractor 30*a*, the sheet-shaped conductive element 40, and the induction coil 50*a* are integrally encapsulated into a component module to facilitate access.

In a variation implementation shown in FIG. 7, the sheet-shaped conductive element 40 may be arranged outside the induction coil 50*a*, that is, arranged between the induction coil 50*a* and the protective cover 80*a* in the radial direction, and the sheet-shaped conductive element 40 is held and fixed through a fixing structure arranged on an inner wall of the protective cover 80*a*. Similarly, two ends of the induction coil 50*a* are respectively welded to corresponding sheet-shaped conductive elements 40.

In still another preferred implementation, the extraction assembly may further include:

an electromagnetic shielding film (not shown in the figure), extending in an axial direction of the induction coil 50*a* and surrounding or wrapping the induction coil 50*a*, and configured to shield or twist magnetic lines of the induction coil 50*a* from the outside, so that the magnetic field generated by the induction coil 50*a* is concentrated inside as much as possible.

In an optional implementation, the electromagnetic shielding film is a flexible electromagnetic shielding film. For example, the electromagnetic shielding film may be a commonly used film of a thickness of 0.2 mm, which is made by heating and melting powder with 30% iron powder, 5% nickel powder, 5% cobalt powder and powder of organic flexible carriers through a film-making process. Metal particles have a granularity of less than 100 nm and are evenly dispersed in a plastic material, so that the performance of magnetic field shielding can be implemented. Alternatively, in another optional implementation, the electromagnetic shielding film is an electromagnetic shielding film made of an alloy coating of nickel, chromium, aluminum, titanium, tin, indium on a flexible substrate such as PI film, PEN film, PEI film, PC film, cloth, or paper by deposition, printing, or spraying. Alternatively, in still another optional implementation, the electromagnetic shielding film is a film of a metal or an alloy with a lower thickness of high conductivity, high permeability, such as an Al film, a copper film, a titanium film, or a deposited magnetic metal foil with high permeability, such as a ferroalloy foil, a cobalt alloy foil, and a nickel alloy foil.

Another embodiment of this application further provides a vapor generation device. As shown in FIG. 3, an airflow channel path R2 includes:

an inlet, defined by a gap at a combined part of the upper housing 10 and the lower housing 20, and configured to allow external air to flow into the vapor generation device during inhalation;

a first part R21, after assembly, defined between the upper housing 10 and an outer wall of a part of the lower housing 20 surrounded by the upper housing 10, and extending in a direction toward the near end 110;

a second part R22, defined between the cylindrical extractor 30 and an inner wall of the lower housing 20 forming the cavity 22, and extending in a direction toward the far end 120; and a third part R23, during inhalation, inhaled toward the near end 110 from an end portion of the inner wall forming the cavity 22 that is close to the far end 120 and enters the extractor 30 through the hole 33.

In this embodiment, the susceptor 60 penetrated by the magnetic field and generating heat may further be replaced in a heat-generating manner such as resistance or infrared.

It should be noted that, the specification of this application and the accompanying drawings thereof illustrate preferred embodiments of this application, but this application is not limited to the embodiments described in the specification. Further, a person of ordinary skill in the art may make improvements or variations according to the foregoing descriptions, and such improvements and variations shall all fall within the protection scope of the appended claims of this application.

What is claimed is:

1. A vapor generation device, configured to heat a vapor generation article to generate an aerosol for inhalation, comprising:

a cavity, configured to receive a vapor generation article;

a susceptor, configured to be penetrated by a changing magnetic field and generate heat, to heat the vapor generation article received in the cavity;

an extractor, at least partially received in the cavity and configured to extract the vapor generation article through movement in an axial direction of the cavity or removal from the cavity;

an induction coil, configured to generate the changing magnetic field, and combined with the extractor and held by the extractor; and a first electrical contact, configured to conduct with the induction coil when the extractor is received in the cavity, to supply power to the induction coil.

2. The vapor generation device according to claim 1, wherein the first electrical contact is located in the cavity.

3. The vapor generation device according to claim 2, wherein a second electrical contact electrically connected to the induction coil is formed on the extractor; and the first electrical contact is configured to conduct with the induction coil by conducting with the second electrical contact when the extractor is received in the cavity.

4. The vapor generation device according to claim 3, further comprising:

a conductive element, electrically connected to the induction coil, and forming the second electrical contact by at least a part of the conductive element.

5. The vapor generation device according to claim 4, wherein the conductive element comprises a first part extending in an axial direction of the induction coil and a second part extending in a radial direction of the induction coil, wherein:

the induction coil is electrically connected to the first part; and the second part forms the second electrical contact.

6. The vapor generation device according to claim 4, wherein the conductive element is positioned between the extractor and the induction coil.

7. The vapor generation device according to claim 4, wherein the extractor is provided with a holding groove, and the conductive element is at least partially accommodated and held in the holding groove.

8. The vapor generation device according to claim 4, wherein a connection point protruding relative to the conductive element is arranged on the conductive element, and the induction coil is electrically connected to the conductive element through the connection point.

9. The vapor generation device according to claim 4, wherein the conductive element is in a sheet shape.

10. The vapor generation device according to claim 1, wherein the induction coil has an inner diameter in a range of 6.0 mm to 7.5 mm.

11. The vapor generation device according to claim 1, wherein a protrusion is arranged on the extractor, and the protrusion is configured to abut against an inner wall of the cavity when the extractor is received in the cavity, to maintain a channel that allows air to enter the extractor and that is between the extractor and the inner wall of the cavity.

12. The vapor generation device according to claim 1, further comprising:

a magnetic field shielding member, configured to surround or wrap the induction coil in a circumferential direction of the induction coil.

13. The vapor generation device according to claim 1, further comprising:

a housing having a near end and a far end opposite to each other in a longitudinal direction, wherein the housing comprises:

a lower housing, close to the far end, and having an inner wall and an outer wall opposite to each other in a radial direction, wherein the inner wall defines the cavity extending in the longitudinal direction;

an upper housing, close to the near end, and at least partially surrounding the outer wall of the lower housing; and an airflow channel, comprising a first part extending between the upper housing and the outer wall of the lower housing along the far end toward the near end, and a second part extending between the inner wall of the lower housing and the extractor along the near end toward the far end.

14. The vapor generation device according to claim 1, further comprising:

a near end and a far end opposite to each other in a longitudinal direction;

a lower housing, close to the far end, and having an inner wall and an outer wall opposite to each other in a radial direction, wherein the inner wall defines the cavity extending in a longitudinal direction;

a heater, configured to at least partially extend in the cavity to heat the vapor generation article received in the cavity;

an upper housing, close to the near end, and at least partially surrounding the outer wall of the lower housing; and an airflow channel, comprising a first part extending between the upper housing and the outer wall of the lower housing along the far end toward the near end, and a second part extending between the inner wall of the lower housing and the extractor along the near end toward the far end.

15. The vapor generation device according to claim 14, wherein a gap at a combined part of the upper housing and the lower housing forms an inlet of the airflow channel.

16. The vapor generation device according to claim 14, wherein the airflow channel further comprises a third part extending in the extractor along the far end toward the near end.

* * * * *